UNITED STATES PATENT OFFICE.

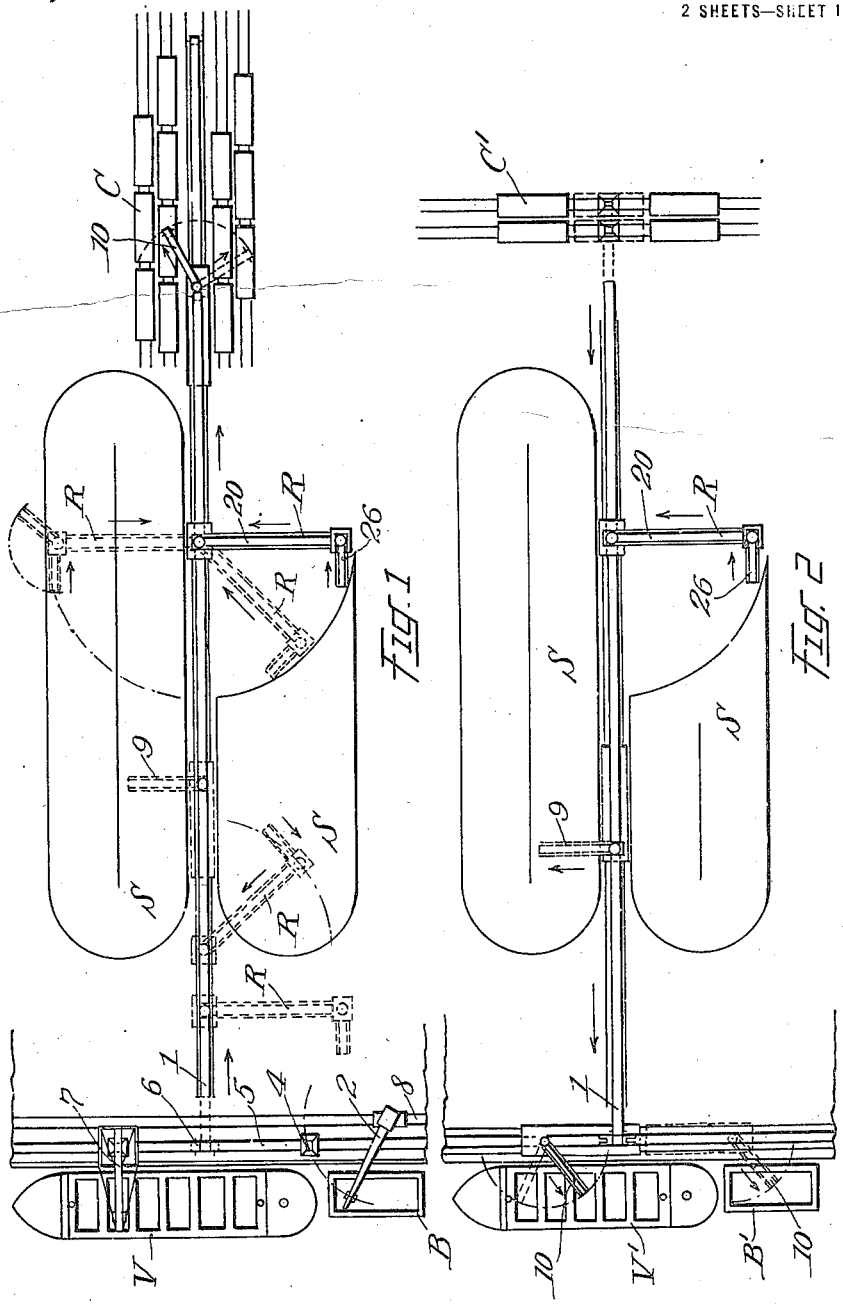

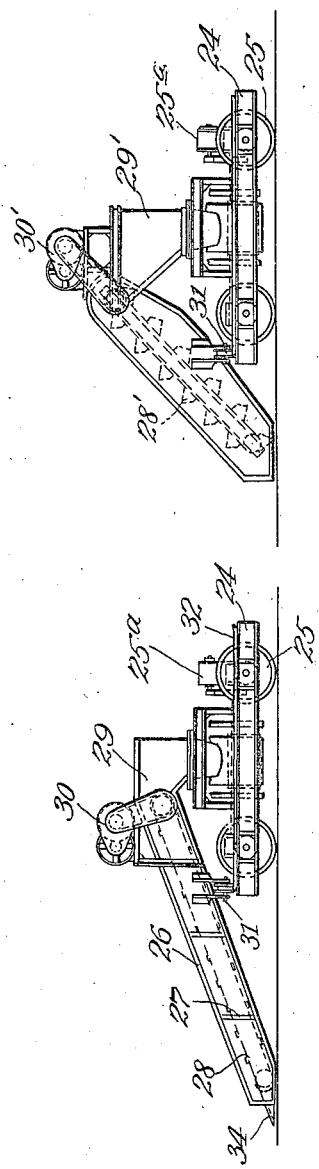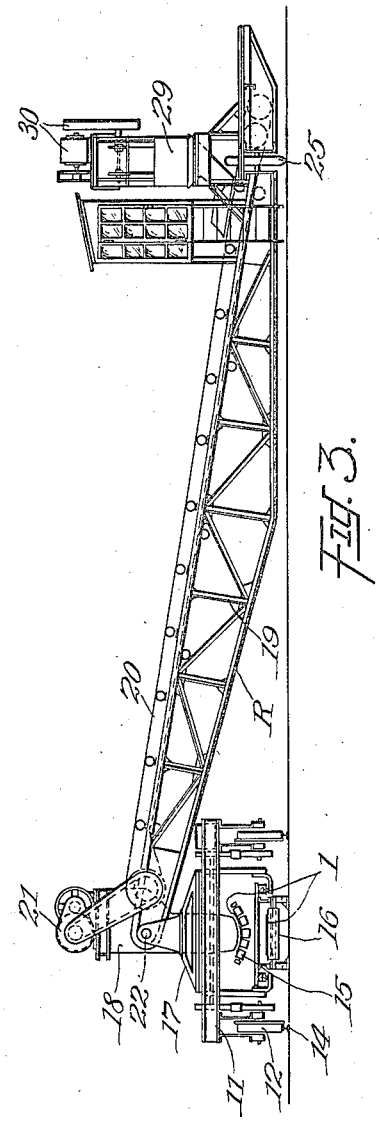

FRANCIS LEE STUART, OF WASHINGTON, DISTRICT OF COLUMBIA, ASSIGNOR TO INTERNATIONAL CONVEYOR CORPORATION, OF NEW YORK, N. Y.

SYSTEM AND APPARATUS FOR RECLAIMING MATERIALS.

1,300,672.  Specification of Letters Patent.  Patented Apr. 15, 1919.

Application filed November 13, 1917. Serial No. 201,798.

*To all whom it may concern:*

Be it known that I, FRANCIS LEE STUART, a citizen of the United States, and a resident of the city of Washington, in the District of Columbia, have invented certain new and useful Improvements in Systems and Apparatus for Reclaiming Materials, of which the following is a specification.

This invention relates to reclaiming and conveying apparatus of the kind in which the material to be conveyed is gathered from a place for storage or supply and transferred to a conveyer which carries it to its destination, and the object of my invention is to provide an apparatus of this class which shall have a wide range to operate over an extended area while still associated with the conveyer which carries the material to its destination.

In carrying out my invention, I have provided a main conveyer belt which may be of great length in order to carry the gathered material from the place of supply to a distant point. This conveyer is arranged parallel with a track over which travels a truck provided with a hopper delivering to the main conveyer belt and which is equipped with a turn-table to which is connected a reclaimer frame carrying a belt conveyer driven by a motor carried by the frame. Said reclaimer frame turns with the table and it is also pivoted at its inner end in such manner as to turn about a horizontal axis. At its outer end the reclaimer frame is supported by a truck which is driven by a motor carried by the frame in such manner that said frame may be swung around its vertical axis to any desired extent. The truck carrying the turn-table to which the reclaimer frame is pivotally connected is provided with a motor for driving it so that the truck under its own power may be moved to any desired place over the main conveyer belt. Material to be gathered may be supplied to the outer end or any portion of the conveyer by suitable gathering apparatus; preferably, however, a digger is mounted on the outer end of the reclaimer frame which gathers the material and delivers it to the conveying belt of the reclaimer. Said digger is so mounted on the outer end of the reclaimer frame that it may be swung about a vertical axis to any desired extent independently of any movement of the reclaimer.

In the accompanying drawings:

Figure 1 is a plan view, largely diagrammatic, illustrating my improved reclaiming apparatus associated with other apparatus for unloading, storing, reclaiming and reloading materials.

Fig. 2 is a similar view showing another way of associating my improved reclaiming apparatus with other conveyers and with other apparatus for loading and unloading materials.

Fig. 3 is a side view of my improved reclaiming apparatus, the digger being shown at right angles to the boom conveyer.

Fig. 4 is a side view of one form of digger that may be employed.

Fig. 5 is a side view of a modified form of digger that may be used.

Referring more particularly to the drawings, I have illustrated a system and apparatus for reclaiming and reloading material adapted to employ one or more main conveying belts, or other conveying means 1 for receiving the material to be handled from any desired source and then delivering the same at a point usually distant from the receiving point to the places or receptacles desired. In the apparatus shown more particularly in Fig. 1, the main conveying belt or the like is adapted to receive coal, ore or other material in loose or bulk form from a vessel V, a barge B, or a storage pile, or piles S and deliver the same either to a storage pile, when received from the vessel or barge, or to the cars C when received from any of these sources. In unloading the material from vessels, barges and the like, I may employ traveling cranes 2 of the type illustrated in my Patent No. 1,207,237, of December 5, 1916, and deliver the same to movable hoppers 4 adapted to discharge to the carrier belt 5 which in turn supplies the conveyer belt 1 through looped portions 6 constituting discharging trippers which may be of the general construction disclosed in my Patent No. 1,204,203 of November 7, 1916. I may, on the other hand, make use of a raising and conveying mechanism 7 such as illustrated in my Patent No. 1,230,236 of June 19, 1917, which may also deliver to the carrier belt 5 discharging to the main conveyer belt. It will be apparent that where a traveling crane is employed, it may be moved to the desired position for unloading purposes by providing a track or runway 8 of any usual and well known construction. The raising apparatus 7 may be moved in a similar manner along the carrier belt 6 so that the most effective unloading positions may be reached. In case there is no carrier at hand for supplying the material desired, it may be necessary to reclaim or recover the same from a suitable storage pile or piles S by means of a reclaimer R hereinafter more particularly described. On the other hand, in case it is desired to store the material thus received, the main conveying means may deliver the same to trimmers 9 constructed in the manner described in my Patent No. 1,241,053 of September 25, 1917. The material on the conveying means 1, no matter from what source received, may be reloaded in the cars C by means of trimmers 10 of the type shown in my Patent No. 1,207,237 referred to.

In Fig. 2 I have illustrated the apparatus in such form that its range of usefulness will be more readily apparent. As here shown, the conveyer belt 1 receives material from cars C', or from a reclaimer R, and delivers the same either to an adjustable trimmer 9 of the kind hereinbefore described, or to loading trimmers 10 adapted to supply the vessel V' or barge B'. In its essentials, the apparatus illustrated in Fig. 2 is a reversal of that illustrated in Fig. 1 as to the source of supply and discharge.

In the foregoing description I have indicated how the reclaiming apparatus hereinafter claimed may be associated with other apparatus for unloading, storing, conveying and loading materials of various kinds, but principally coal and ore.

The reclaiming apparatus R herein illustrated and briefly referred to, is shown more particularly in Figs. 3, 4 and 5 of the drawings, and preferably comprises a main supporting truck 11 having wheels 12 adapted to travel on trackways 14 so disposed that the conveyer 1 lies intermediate the rails constituting a trackway, so that the reclaiming apparatus may readily discharge thereto while in any position. The upper run of the conveyer 1 is shown as traveling on troughing rolls 15, while the lower run is supported by rolls 16 as has heretofore been common in this art. The entire central portion of the truck comprises a turn-table 17 carrying a hopper 18 adapted to receive the material from the reclaimer and discharge the same to the main conveyer. In this form, the reclaimer comprises a boom or truss 19 having a boom conveyer belt 20 thereon driven from any suitable source of power 21. The inner end of the boom or truss 19 is pivoted at 22 to the turn table 17 so that it has a vertically swinging movement independent of the truck, in addition to the horizontal rotatable movement to the extent indicated by dotted lines in Fig. 1.

The outer end of the boom is carried by a carriage 24 having supporting wheels 25, driven by a suitable motor 25ᵃ for swinging the outer end of the carriage, and carrying the digger 26 comprising a suitable supporting frame 27 for the digging and lifting belt 28 adapted to discharge to the hopper 29 which in turn delivers to the outer end of the boom conveyer belt. The hopper 29 together with the digger 26 and driving mechanism 30 is supported for rotation independently of the carriage 24 by the wheels 31 traveling on the track 32 formed concentrically around the axis of rotation of the hopper. The outer end of the digger 26 may be provided with a nose or plow portion 34 adapted to extend into, and under the material so as to raise the same into a position in which it may be recovered by the digger belt. In Fig. 5 I have shown a modified type of digger comprising a bucket elevator 28' delivering to the hopper 29' when driven by the motor 30'. The bucket elevator is mounted for movement in a manner similar to the belt digger previously described. It will now be apparent that due to the adjustments which may be given to the boom, and also the independent adjustments which may be given to the digger, that the apparatus is useful for reclaiming material even though deposited over a large area.

It will be observed that the reclaiming conveyer R is so mounted on the truck 11 that it may be swung to any desired extent on one side of the main conveyer belt and may then be swung over to the other side of the belt. This is illustrated in Fig. 1 of the drawings, and thus the arrangement is such that the reclaimer may receive material from a large area on one side of the belt and then swung over to the opposite side of the belt and receive a like amount of material there. It is also apparent that the truck 11 may be shifted from time to time and thus material from large piles or from large places of storage may be collected. Furthermore, when a digger of the class illustrated is employed and where such digger is mounted on the outer end of the reclaimer in such manner that it may be swung about a vertical axis, the range of service of the reclaimer as a whole for collecting material may be varied and extended within wide limits.

What I claim is:—

1. In a system of the class hereinbefore described a main conveyer, a truck-supported secondary conveyer longitudinally adjustable over said main conveyer for supplying it, pivotal connections between said truck and the inner end of the secondary conveyer, a truck on the outer end of said secondary conveyer, a turn-table thereon, a hopper carried by and turning with the turn-table, and a digger mounted on said truck discharging into said hopper and turning therewith about a vertical axis.

2. In a system of the class described a main conveyer belt, a motor-driven truck mounted to move from place to place over said belt, a turn-table on said truck, a boom conveyer supported at its inner end by said turn-table and swinging therewith and which is also mounted to move about a horizontal axis, a conveyer belt carried by said boom and which delivers to said main conveyer, and a power-driven truck on the outer end of the boom conveyer for swinging said conveyer with said turn-table about a vertical axis.

3. In a system of the class described a main conveyer belt, a track parallel therewith, a truck mounted on said track, a turn-table on said truck, a boom conveyer supported at its inner end by said turn-table and pivotally connected therewith to move about a horizontal axis whereby said boom conveyer may be elevated and turned from one side of the truck to the other, and a power-driven truck for supporting the outer end of said boom conveyer.

4. In a system of the class described a main conveyer belt, a track parallel therewith, a truck mounted on said track, a turn-table on said truck, a boom conveyer supported at its inner end by said turn-table and pivotally connected therewith to move about a horizontal axis whereby said boom conveyer may be elevated and turned from one side of the truck to the other, a power-driven truck for supporting the outer end of said boom conveyer, and a digger carried by said boom conveyer.

5. In a system of the class described a main conveyer belt, a track parallel therewith, a truck mounted on said track, a turn-table on said truck, a boom conveyer supported at its inner end by said turn-table and pivotally connected therewith to move about a horizontal axis whereby said boom conveyer may be elevated and turned from one side of the truck to the other, a power-driven truck for supporting the outer end of said boom conveyer, and a digger mounted on the outer end of said boom conveyer.

6. In a system of the class described a main conveyer belt, a track parallel therewith, a truck mounted on said track, a turn-table on said truck, a boom conveyer supported at its inner end by said turn-table and pivotally connected therewith to move about a horizontal axis whereby said boom conveyer may be elevated and turned from one side of the truck to the other, a power-driven truck for supporting the outer end of said boom conveyer, and a digger carried by said boom conveyer and mounted to move about a vertical axis.

7. In a system of the class described a main conveyer belt, a track parallel therewith, a truck supported on said track, a motor for driving said truck, a turn-table carried by the truck and provided with a hopper delivering to said main conveyer belt, and a boom conveyer supported at its inner end by said turn-table delivering through the hopper to the main conveyer belt and which is pivotally mounted at its inner end to move about a horizontal axis whereby the outer end of the boom conveyer may be elevated and swung from one side of the track to the other to gather material on either side thereof.

8. An apparatus for reclaiming stored material, comprising a main receiving conveyer belt, a boom conveyer rotatably adjustable with regard thereto and movable longitudinally thereof for supplying the same with material in different vertical planes, and a digger carried by said boom conveyer and rotatably adjustable independently of any adjustment of said boom conveyer.

In testimony whereof, I have hereunto subscribed my name.

FRANCIS LEE STUART.